United States Patent Office 3,726,851
Patented Apr. 10, 1973

3,726,851
WATER-SOLUBLE BENZOTHIAZOLYLPHENYL-
AZO-BARBITURIC ACID DYESTUFFS
Alvin Carl Litke, West Seneca, N.Y., assignor to Allied
Chemical Corporation, New York, N.Y.
No Drawing. Filed Sept. 23, 1970, Ser. No. 74,848
Int. Cl. C09b 29/36; D21h 1/46
U.S. Cl. 260—154
9 Claims

ABSTRACT OF THE DISCLOSURE

Monoazo dyestuffs of the formula

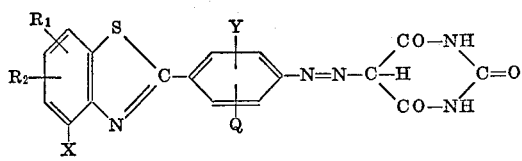

wherein $R_1$, X and Y are hydrogen, lower alkoxy or lower alkyl; $R_2$ and Q are H or $SO_3H$ with at least one being $SO_3H$; and Q is oxygen, sulfur, imino, or lower alkyl imino, and which paper dyeings are alkali- and acid-fast and are discharged on contact with conventional bleaching agents.

---

This invention relates to novel water-soluble monoazo dyestuffs and more particularly to novel bright greenish-yellow dyes for paper. It is especially concerned with novel monoazo paper dyes containing the 2-phenylbenzothiazole nucleus.

It is known (see U.S. Pat. 3,426,010) to prepare water-soluble monoazo paper dyestuffs containing the 2-phenylbenzothiazole nucleus by coupling a diazotized 2-(4-aminophenyl)benzothiazole sulfonic acid (such as, diazotized 2-(p-aminophenyl) - 6 - methyl - 7 - benzothiazolesulfonic acid) with a coupling component which contains an aliphatic amido group, that is —$CH_2$—CONH—, as a member of a heterocyclic nucleus, for example 3-methyl-5-pyrazolone. These prior art dyestuffs color paper in relatively weak dull yellow shades having unattractive reddish tones.

It is the principal object of the present invention to devise novel water-soluble monoazo dyestuffs containing the 2-phenylbenzothiazole nucleus.

It is another object of the invention to prepare novel dyestuffs which dye paper in bright greenish-yellow shades of excellent tinctorial strength.

These and other objects and advantages will be apparent from the following description of my invention.

SUMMARY OF THE INVENTION

The above objects are attained and the aforementioned disadvantages of the prior art dyestuffs are overcome in novel dyestuffs of the invention corresponding to the formula

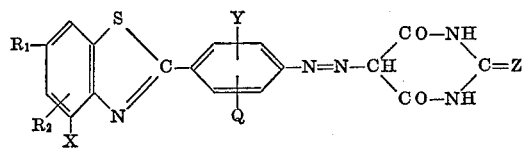

wherein $R_1$, X and Y are selected from hydrogen, lower alkoxy and lower alkyl radicals, that is, alkoxy and alkyl radicals of one to four carbon atoms, $R_2$ and Q are selected from hydrogen and sulfonic acid radicals, at least one of $R_2$ and Q being a sulfonic acid radical, Z is selected from oxygen, sulfur, imino and lower alkylimino radicals, that is, alkylimino radicals containing one to four carbon atoms.

DETAILED DESCRIPTION OF THE INVENTION
AND PREFERRED EMBODIMENTS THEREOF

The present novel dyestuffs are prepared by diazotizing an amine of the formula

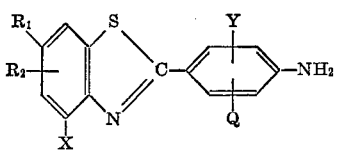

(wherein X, $R_1$, $R_2$, Q and Y have the aforementioned meanings) and coupling the resultant diazonium salt in aqueous media with barbituric acid or a 2-substituted derivative thereof. Diazotization, coupling and recovery of the dyestuff are effected in conventional manner, for example by the techniques disclosed in aforementioned U.S. Pat. 3,426,010.

Although the dyestuffs of the invention are prepared from amine reactants similar to those of U.S. Pat. 3,426,010 and from coupling components containing an aliphatic amido group as a member of a heterocyclic nucleus, the present dyes surprisingly color paper and paper pulp in yellow shades of an attractive greenish tone. Unexpectedly, the dyes of the invention are brighter and tinctorially stronger than the aforementioned prior art paper dyes. It was also surprising to discover that the instant dyestuffs, albeit strongly substantive to paper and paper pulp, have little affinity for cotton.

The amine reactant charged in preparing the present dyestuffs should contain in accordance with the foregoing structural formula one or two aromatic sulfonic acid substituents, that is, sulfonic acid radicals including the sodium, potassium or other alkali metal salts thereof or the ammonium salts thereof. Suitable amine reactants can be prepared according to procedures disclosed by M. Schubert Ann., 558 10 (1947) and the aforementioned U.S. Pat. 3,426,010. Representative aromatic aminosulfonic acids suitable for preparing the present dyestuffs include the following examples listed in free acid form in azo-couplings with barbituric acid.

2-(p-aminophenyl)-6-methyl-7-benzothiazolesulfonic
  acid→barbituric acid
2-(p-aminophenyl)-6-methyl-5-benzothiazolesulfonic
  acid→barbituric acid
2-(3-methyl-4-amino-5-sulfophenyl)-4,6-dimethyl-7-
  benzothiazolesulfonic acid→barbituric acid
2-(3-ethoxy-4-amino-5-sulfophenyl)-4-ethoxy-6-
  methyl-7-benzothiazolesulfonic acid→barbituric acid
2-(3-methyl-4-aminophenyl)-6-methyl-7-benzothiazole-
  sulfonic acid→barbituric acid
2-(3-methoxy-4-aminophenyl)-4-methoxy-6-methyl-7-
  benzothiazolesulfonic acid→barbituric acid
2-(3-methoxy-4-aminophenyl)-6-ethoxy-7-benzo-
  thiazolesulfonic acid→barbituric acid 2-(3-methoxy-4-amino-5-sulfophenyl)-6-isopropoxy-
7-benzothiazolesulfonic acid→barbituric acid
2-(p-aminophenyl)-7-benzothiazolesulfonic acid→
barbituric acid
2-(p-aminophenyl)-6-t-butyl-7-benzothiazolesulfonic
acid→barbituric acid
2-(p-aminophenyl)-6-ethyl-5-benzothiazolesulfonic
acid→barbituric acid
5-amino-2-(6-methylbenzothiazole-2-yl)benzenesulfonic
acid→barbituric acid
2-amino-5-(6-methylbenzothiazol-2-yl)benzenesulfonic
acid→barbituric acid
2-(3-n-butyl-4-aminophenyl)-4-n-butyl-6-methyl-7-
benzothiazolesulfonic acid→barbituric acid
2-(p-aminophenyl)-6-n-butyl-7-benzothiazolesulfonic
acid→barbituric acid Mixtures of these and equivalent 2-(p-aminophenyl) benzothiazolesulfonic acids can be employed in this respect also.

Preferably I employ as amine reactant a 2-(p-aminophenyl)-6-lower alkyl benzothiazole containing a single sulfonic acid substituent, especially 2-(p-aminophenyl)-6-methyl-5- or 7-benzothiazolesulfonic acid.

Coupling components contemplated in preparing the present novel dyestuffs are barbituric and derivatives thereof which contain a divalent substituent other than oxygen in the 2 position of the barbituric acid nucleus. Typical suitable coupling components include the following representative examples:

barbituric acid
2-thiobarbituric acid
2-methyliminobarbituric acid
2-mehtyliminobarbituric acid
2-n-propylimino-barbituric acid
2-isopropyliminobarbituric acid
2-n-butyliminobarbituric acid
2-t-butyliminobarbituric acid Barbituric acid is the preferred coupling component of my invention.

The present novel dyestuffs dye paper and paper pulp in aqueous media according to conventional dyeing techniques, that is in the presence or absence of paper size and alum. Conveniently the present dyes are charged to the dyebath as an alkali metal salt or as a mixture of such salts, e.g. a mixture of lithium and sodium salts. If desired a dyestuff of the invention can be charged to the dyebath in the form of an aqueous solution of its alkali metal salt.

The present dyestuffs dye paper and paper pulp in fast bright yellow shades characterized by an attractive greenish tone. Paper dyeings of the invention also possess the commercially desirable properties of being alkali- and acid-fast and being discharged on contact with conventional bleaching agents, such as aqueous alkali metal hypochlorite.

In the following examples which serve to illustrate my invention, parts, percentages and proportions are by weight unless otherwise indicated and temperatures are in degrees centigrade.

Example 1

To an agitated mixture of 33.7 parts (0.1 mol) of the ammonium salt of dehydrothio-p-toluidine monosulfonic acid (essentially 2-(p-aminophenyl) 6-methyl-7-benzothiazole monosulfonic acid—see Colour Index 2nd Ed., vol. 3, p. 3050) and 300 parts water are charged about 8 parts 50° Bé. aqueous sodium hydroxide. After the addition of 7.2 parts (0.104 mol) sodium nitrite, the mass is agitated for 10 minutes at ambient temperature. After addition of 5 parts Solka Floc (a flocculent purified wood cellulose filter aid, Brown Co.) the mixture is filtered. Over a period of about two hours, the resultant filtrate is charged to a mixture of 47.7 parts of aqueous 20° Bé. hydrochloric acid and 50 parts water. The resultant mixture is agitated for one hour at 10°.

Over a period of about thirty minutes, a 50% by volume aliquot of the resultant diazotization mixture is charged to a mixture of 6.4 parts (0.0384 mol) of barbituric acid, 50 parts of water and 7 parts lithium hydroxide monohydrate. The coupling mass is agitated for about 16 hours at ambient temperature and filtered to collect product which is dried at 80–90° under a current of circulating air. There is thus obtained 23 parts of a mixture of the sodium and lithium salts of the dyestuff which in its free-acid form has the structural formula:

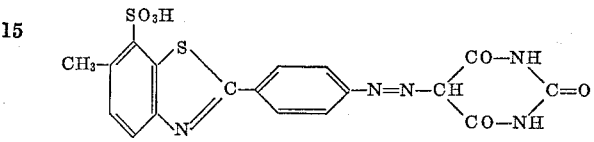

This product dyes paper in a bright greenish yellow shade.

The following example illustrates the dyeing of paper with dyestuffs of the invention.

Example 2

To 250 parts by volume of an aqueous slurry containing 3 parts paper pulp (Puget Sound Bleached Sulfite pulp) is charged 2.5 parts by volume of a solution prepared by dissolving about 0.75 part of the dye of Example 1 in about 500 parts by volume of water. After the resultant aqueous mixture has been agitated for about 5 minutes, 4 parts by volume of a 3% aqueous slurry of a fortified rosin size (Pexol, Hercules Powder Co.) and 4 parts by volume of a 10% aqueous solution of alum (aluminum sulfate octadecahydrate) are charged. After being agitated for an additional 20 minutes, the mixture is filtered through a metal screen. The recovered sheet of dyed pulp is pressed between two layers of blotting paper to express any adherent dye liquid and dried at about 100°. The resultant paper sheet is dyed in an excellent fast bright yellow shade having an attractive greenish tone.

When the foregoing procedure is repeated metting the size and alum, there is also obtained an excellent greenish-yellow paper dyeing.

The color of the above-described dyed paper samples is unchanged on contact with aqueous acid or alkali but is readily discharged on treatment with 2% aqueous sodium hypochloride for 15 minutes at about 50°.

The aforementioned paper dyeings are substantially greener, stronger and brighter than comparable paper dyeings of the dyestuff of Example 1 of U.S. Pat. 3,426,010 (which is also charged to the dyebath in the form of a lithium-sodium salt mixture).

I claim:

1. A water-soluble monoazo dyestuff of the structural formula

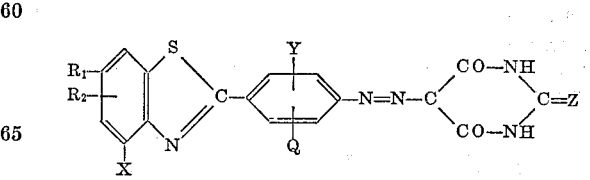

wherein $R_1$, X and Y are selected from hydrogen, lower alkoxy and lower alkyl radicals, $R_2$ and Q are selected from hydrogen and sulfonic acid radicals, at least one of $R_2$ and Q being a sulfonic acid radical, Z is selected from oxygen, sulfur, imino lower alkylimino radicals.

2. A dyestuff as claimed ni claim 1 which contains a single sulfonic acid substituent.

3. A dyestuff as claimed in claim 1 wherein Z is oxygen.

4. A dyestuff as claimed in claim 1 wherein $R_1$, X and Y are hydrogen or lower alkyl radicals.

5. A dyestuff as claimed in claim 4 wherein $R_1$ is methyl and X and Y are hydrogen.

6. A dyestuff as claimed in claim 5 which contains one sulfonic acid radical.

7. A dyestuff as claimed in claim 6 wherein Z is oxygen.

8. A dyestuff as claimed in claim 7 which in its free-acid form has the structural formula:

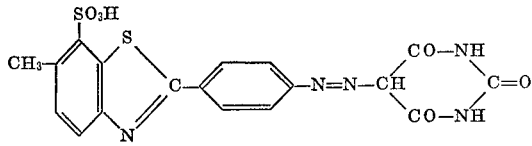

9. A dyestuff as claimed in claim 7 which in its free-acid form has the structural formula:

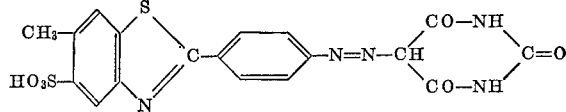

References Cited
UNITED STATES PATENTS 2,140,538　12/1938　McNally et al. _____ 260—154
3,426,010　 2/1969　Dunworth _____ 260—158

FLOYD D. HIGEL, Primary Examiner

U.S. Cl. X.R.

8—7; 116—154; 260—304

UNITED STATES PATENT OFFICE
CERTIFICATE OF CORRECTION

Patent No. 3,726,851  Dated April 10, 1973

Inventor(s) Alvin Carl Litke

It is certified that error appears in the above-identified patent and that said Letters Patent are hereby corrected as shown below:

Column 1, line 25, after "alkyl" should read -- imino. These dyestuffs color paper and paper pulp in attractive greenish yellow shades but have little affinity for cotton, and which paper dyeings are alkali- and acid-fast and are discharged on contact with conventional bleaching agents. -- line 33, "methyliminobarbituric" should be -- iminobarbituric --.

line 34, "mehtyliminobarbituric" should be -- methyliminobarbituric --.

Column 4, line 42, "liquid" should be -- liquor --.

Claim 1, in the formula, that portion of the molecule reading

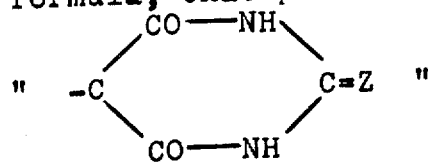

UNITED STATES PATENT OFFICE
CERTIFICATE OF CORRECTION

Patent No. 3,726,851                    Dated April 10, 1973

Inventor(s) Alvin Carl Litke

It is certified that error appears in the above-identified patent and that said Letters Patent are hereby corrected as shown below:

should read

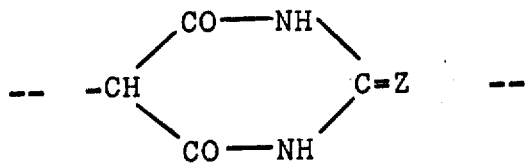

Column 4, line 73, after "imino" insert -- and --.

Signed and sealed this 22nd day of January 1974.

(SEAL)
Attest:

EDWARD M. FLETCHER, JR.            RENE D. TEGTMEYER
Attesting Officer                  Acting Commissioner of Patents

Disclaimer 3,726,851.—*Alvin Carl Litke*, West Seneca, N.Y. WATER-SOLUBLE BENZOTHIAZOLYLPHENYL - AZO - BARBITURIC ACID DYESTUFFS. Patent dated Apr. 10, 1973. Disclaimer filed May 31, 1977, by the assignee, *E. I. du Pont de Nemours and Company*.

Hereby enters this disclaimer to claim 8 of said patent.

[*Official Gazette July 12, 1977.*]